United States Patent Office 3,470,606
Patented Oct. 7, 1969

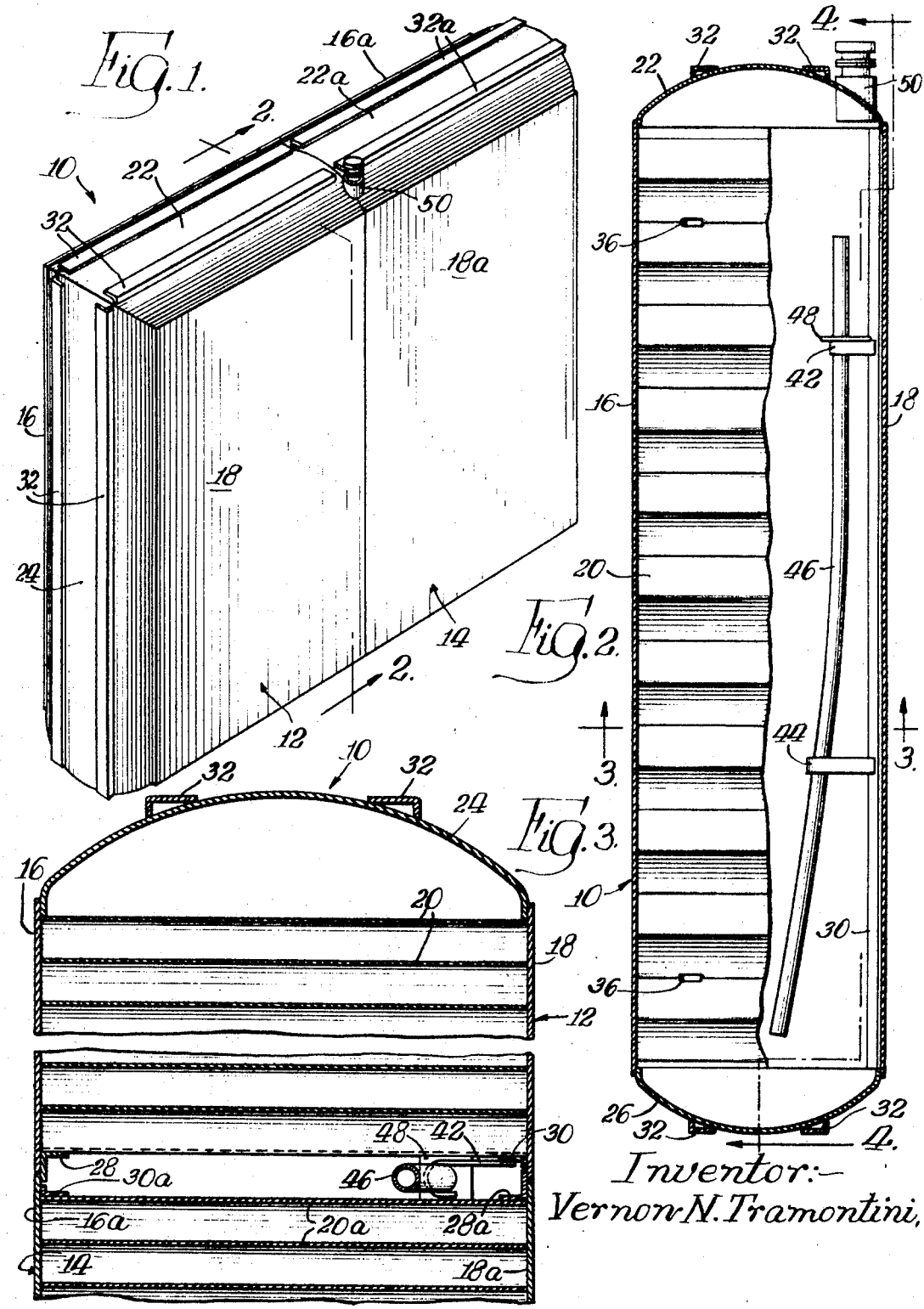

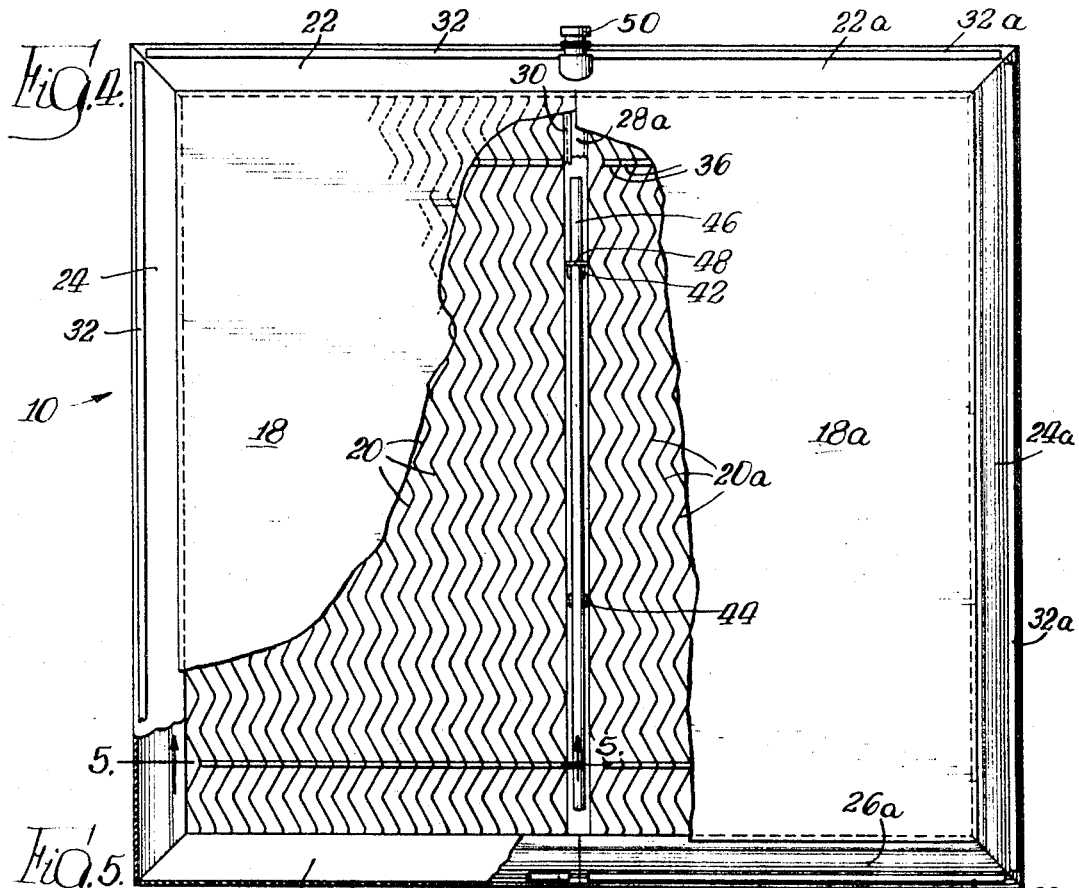

3,470,606
METHOD OF MAKING A CRYOGENIC TANK
Vernon N. Tramontini, Indianapolis, Ind., assignor to Stewart-Warner Corporation, Chicago, Ill., a corporation of Virginia
Filed Sept. 27, 1966, Ser. No. 582,308
Int. Cl. B23k 1/04; B23p 21/60
U.S. Cl. 29—469                                  8 Claims

ABSTRACT OF THE DISCLOSURE

A substantially rectilinear tank for the storage of cryogenic fluids and the method of making same wherein corrugated baffle plates are oriented with respect to each other and to the side plates of the tank to provide maximum support both for the pressures built up when the container is in use and the pressures exerted on the structure during fabricating processes.

---

The present invention relates to a cryogenic tank adapted to be used with a truck, railway car or the like for transporting a refrigerated liquified gas such as nitrogen, and to a method of making such a tank.

Liquified gases are frequently stored and transported in cryogenic tanks or Dewars. In the case of liquified nitrogen, the tank must necessarily withstand an internal pressure of about 200 p.s.i., taking into consideration the maximum pressure of the liquid therein during filling and allowing a suitable safety factor. The most common type of cryogenic tank now in use is comprised of a plurality of generally U-shaped plates arranged in series and welded together to form a rectangular tank. The transverse portions of the plates, which are spaced about 8 inches apart, strengthen the tank against burst and prevent sloshing of the liquid therein. This tank, in turn, is supported within an outer housing, and a vacuum is maintained, and insulation provided, in the space between the tank and the housing. This arrangement has proved unsatisfactory because of the extensive number and length of exposed weld seams in the tank. When the slightest crack develops along any seam, the surrounding vacuum is lost and the liquid in the tank soon boils off because of the excessive heat leak.

It is an object of the present invention to provide a cryogenic tank, and a method of making the same, wherein the number and length of external weld seams is maintained at a minimum.

It is another object of the present invention to provide a cryogenic tank, and a method of making the same, wherein substantially all of the parts thereof are joined together in a brazing operation.

It is another object of the present invention to provide a cryogenic tank, and a method of making the same, comprised of side walls and a plurality of corrugated baffle plates so arranged therebetween that the strength of the corrugations may be utilized during assembly without affecting reinforcement by the baffle plates of the side walls in the final assembly.

It is a further object of the present invention to provide a cryogenic tank, and a method of making the same, wherein strips of brazing foil are folded over the edges of the baffle plates prior to arranging them between the side walls in order to accomplish the brazing.

Now, in order to acquaint those skilled in the art with the manner of the constructing and using cryogenic tanks in accordance with the principles of the present invention, there will be described in connection with the accompanying drawings a preferred embodiment of the invention.

In the drawings:
FIGURE 1 is a perspective view of a cryogenic tank embodying the principles of the present invention;
FIGURE 2 is a sectional view, on an enlarged scale and with certain portions being broken away, taken substantially along the line 2—2 in FIGURE 1, looking in the direction indicated by the arrows;
FIGURE 3 is a fragmentary sectional view, on a further enlarged scale, taken substantially along the line 3—3 in FIGURE 2, looking in the direction indicated by the arrows;
FIGURE 4 is a view, partly in section and partly in elevation and on a slightly reduced scale, taken substantially along the line 4—4 in FIGURE 2, looking in the direction indicated by the arrows;
FIGURE 5 is a fragmentary sectional view illustrating a portion of a tank module in a pre-assembly stage; and
FIGURE 6 is a fragmentary and elevational view of the portion of the tank module of FIGURE 5.

Referring now to FIGURE 1, there is indicated generally by the reference numeral 10 a rectangular cryogenic tank constructed in accordance with the principles of the present invention. The tank 10 is preferably composed of two modules or sections 12 and 14 which, as will be presently explained, are first fabricated individually and then joined together.

As shown in FIGURES 1-4, the module 12 is comprised of a pair of flat rectangular parallel side panels 16 and 18 presenting peripheral edges, a plurality of baffle plates or fins 20 extending between the panels, and formed end wall portions 22, 24 and 26 extending between and along three edges of the panels whereby the module presents one open end. To be noted is that the baffle plates 20 are each formed with a plurality of parallel corrugations that are arranged to extend perpendicular to the side panels 16 and 18. In addition, angle bars 28 and 30 are disposed along the edges of the side panels 16 and 18 adjacent the open end of the module 12, and pairs of angle strips 32 are located lengthwise of the end wall portions 22, 24 and 26.

Although the module 12 is used in an upright position with the side panels 16 and 18 extending vertically, during fabrication the module is laid on its side with the side panels disposed horizontally as shown in FIGURES 5 and 6. In the assembly operation, strips of brazing foil 34 are folded over the side edges of the baffle plates 20 and the latter are arranged between the side panels 16 and 18 with the brazing foil in contact with the panels. The baffle plates 20 are maintained in spaced relation by means of lateral locating tabs 36 punched therefrom at staggered locations in alternative plates. Also, the end wall portions 22, 24 and 26, the angle bars 28 and 30, and the angle strips 32 are located in the relative positions shown in FIGURES 1-4, and suitable brazing foil or wire is disposed along the edges of the foregoing parts. The abutting edges of the end wall portions 22 and 24, and 24 and 26, are preferably welded together, and tack welding may be performed at spaced locations to maintain the side panels, end wall portions, angle bars and angle strips in proper position prior to brazing.

Preparatory to the brazing operation and while the lower side panel 16 (FIGURES 5 and 6) is supported on a platform 38, a weighted member or gating 40 is placed on the upper side panel 18 whereby compressive forces are applied to the outer faces of the side panels 16 and 18. The described assembly is then immersed in a fluxing salt bath in a furnace, and the brazing foil is heated to proper brazing temperature. Finally, the assembly is removed from the salt bath, air cooled rapidly for heat treating and water quenched to aid in salt removal. During the brazing operation, the sides edges of the baffle plates 20 are joined to the inner faces of the side panels 16 and 18, and the other parts of the module 12 are similarly joined together. If desired, the end wall portions 22, 24 and 26 may be joined to the side panels 16 and 18 by welding rather than brazing.

The module 14 is assembled and fabricated in a brazing operation in the same manner as the module 12. Therefore, a detailed description thereof is deemed unnecessary. Like reference numerals followed by the subscript letter *a* have been used to indicate those parts of the module 14 that are the same as or similar to the parts of the module 12.

In the final stages of tank assembly, brackets 42 and 44 (FIGURES 2 and 3) are tack welded to the angle bar 30 of the module 12, a filler tube 46 is tack welded to the brackets 42 and 44, and a locating plate 48 is tack welded to the filler tube 46. Then, the modules 12 and 14 at their open ends are secured together as by welding to form the closed tank 10. The side panels 16–16a and 18–18a define the tank side walls, while the end wall portions 22–22a, 24, 24a, and 26–26a define the tank end walls. To complete the tank 10, a bellows filler neck 50 is disposed through the end wall portions 22 and 22a at the junction thereof and is suitably secured in position as by welding. As will be appreciated from the foregoing description, the number and length of external weld seams is maintained at a minimum, thereby reducing the risk of leaks and improving the service life of the tank.

In the above-described tank construction, the corrugations of the baffle plates 20 extend perpendicular to the side walls of the tank. This arrangement of the corrugations offers complementary advantages. On the one hand, the corrugations serve to rigidify the baffle plates so that the latter will withstand the compressive forces applied during the brazing operation when the modules are laid on their sides. On the other hand, they do not interfere with reinforcement by the baffle plates on the side walls when the tank is filled with liquid under pressure. Contrastingly, if the corrugations were arranged parallel to the side walls, they would not reinforce the side walls; the walls would bulge out under internal pressure and the corrugations would thereby be straightened as in an accordion being extended. In the present construction, the rigidifying qualities of the corrugations are utilized during assembly, and yet the corrugations are oriented so as to prevent any accordion effect in the final assembly. The baffle plates also serve in a conventional manner to prevent sloshing of liquid within the tank.

Additionally, the use of strips of brazing foil folded over the edges of the baffle plates simplifies the preparation for brazing and effects more uniform brazing that contributes to improved tank strength. Finally, the angle bars 28 and 28a and 30 and 30a serve to retain the baffle plates 20 in position during the brazing operation, the angle bars 28 and 28a back up the abutting edges of the side panels during welding of the modules 12 and 14 together, and the angle bars add structural strength to the center portion of the tank where there are no baffle plates.

For storage of liquid nitrogen, and consistent with safety, a tank should withstand an internal pressure up to 200 p.s.i. A 400-gallon tank 10 of the present invention that satisfactorily mets this requirement has the following general specifications. The tank has a height of about 76 inches, a width of about 80 inches and a depth of about 18 inches; the various parts of the tank are made of 6061 aluminum; the side panels, formed end wall portions and angle bars and strips have a thickness of .125 inch, the baffle plates a thickness of .020 inch, and the braze foil a thickness of .003 inch; and the baffle plates are spaced 1½ inches apart with the amplitude of the corrugations being ¾-inch and the wave length 6 inches. The foregoing general specifications are given for illustrative purposes only. It should be appreciated that the overall dimensions may be varied to provide tanks of modified external configuration or of smaller or larger capacity, and that the other specifications may be varied relatively to accommodate the same, or lower or higher, internal pressures. The tank 10 is preferably preassembled in two sections because of size and also to permit the filler tube 46 to be centrally located as disclosed herein. Finally, the tank 10 is normally mounted in a thermally insulated outer housing. However, such a housing has not been shown or described in detail because it does not form part of the present invention.

While there has been shown and described a preferred embodiment of the present invention, it will be understood by those skilled in the art that various rearrangements and modifications may be made therein without departing from the spirit and scope of the invention.

I claim:

1. A method of fabricating a cryogenic tank composed of two modules each comprised of flat rectangular parallel side panels and end wall portions and a plurality of baffle plates each formed with a plurality of parallel corrugations, comprising first fabricating each module by the steps of arranging the baffle plates in spaced relationship with one another between the side panels with the corrugations of the baffle plates disposed perpendicular to the side panels, disposing the end wall portions between and along the edges of the side panels whereby each module presents one open end, applying a compressive force to the side panels while the baffle plates are maintained rigid by the corrugations thereof, joining the end wall portions and the baffle plates to the side panels in a brazing operation; and then securing the two modules together at their open ends to provide a closed tank.

2. The method of claim 1 wherein the side panels are disposed horizontally during the brazing operation and the compressive forces are applied by placing a weighted member on the module.

3. In the method of claim 1 in which the baffle plates are arranged in spaced relationship with one another with the aid of lateral locating tabs punched in each of the baffle plates.

4. In the method of claim 2 in which the baffle plates are arranged in spaced relationship with one another with the aid of lateral locating tabs punched in each of the baffle plates.

5. In a method of fabricating a liquid storage cryogenic tank of flat rectangular parallel side panels, end wall portions and a plurality of baffle plates each formed with a plurality of parallel corrugations, comprising the steps of arranging the baffle plates in spaced relationship with one another between the side panels with the corrugations of the baffle plates disposed perpendicular to the side panels, disposing the end wall portions between and along the edges of the side panels, applying a compressive force to the side panels while the baffle plates are maintained rigid by the corrugations thereof, and joining the end wall portions and the baffle plates to the side panels in a brazing operation.

6. The method of claim 5 wherein the side panels are disposed horizontally during the brazing operation and the compressive forces are applied by placing a weighted member on the module.

7. In the method of claim 5 in which the baffle plates are arranged in spaced relationship with one another with the aid of lateral locating tabs punched in each of the baffle plates.

8. In the method of claim 6 in which the baffle plates are arranged in spaced relationship with one another with the aid of lateral locating tabs punched in each of the baffle plates.

References Cited

UNITED STATES PATENTS

| 2,900,713 | 8/1959 | Young. | |
| 2,982,441 | 5/1961 | Farrell | 220—71 |
| 3,024,938 | 3/1962 | Watter | 29—469 X |
| 3,072,225 | 1/1963 | Cremer. | |
| 3,168,782 | 2/1965 | Cochran. | |

JOHN F. CAMPBELL, Primary Examiner

J. L. CLINE, Assistant Examiner

U.S. Cl. X.R.

29—471.1, 501